[12] United States Patent  
Smith et al.

(10) Patent No.: US 7,248,736 B2
(45) Date of Patent: Jul. 24, 2007

(54) ENHANCING IMAGES SUPERIMPOSED ON UNEVEN OR PARTIALLY OBSCURED BACKGROUND

(75) Inventors: R. Theodore Smith, Chappaqua, NY (US); Jan P. Koniarek, Briarcliff Manor, NY (US); Jackie K. Chan, Staten Island, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 430 days.

(21) Appl. No.: 10/827,862

(22) Filed: Apr. 19, 2004

(65) Prior Publication Data

US 2005/0232506 A1    Oct. 20, 2005

(51) Int. Cl.
*G06K 9/34* (2006.01)
(52) U.S. Cl. ..................................... 382/173
(58) Field of Classification Search ............... 382/128, 382/130, 132–133, 173, 176
See application file for complete search history.

(56) References Cited

U.S. PATENT DOCUMENTS

| 5,224,176 A | * | 6/1993 | Crain .......................... 382/136 |
| 5,319,549 A | * | 6/1994 | Katsuragawa et al. ...... 382/108 |
| 5,343,390 A | * | 8/1994 | Doi et al. .................... 382/132 |
| 5,524,130 A | * | 6/1996 | Ohhashi ....................... 378/15 |
| 5,598,481 A | * | 1/1997 | Nishikawa et al. ......... 382/130 |
| 6,047,090 A | * | 4/2000 | Makram-Ebeid ............ 382/257 |
| 6,735,337 B2 | * | 5/2004 | Lee et al. .................... 382/220 |
| 6,819,796 B2 | * | 11/2004 | Hong et al. ................. 382/173 |

\* cited by examiner

*Primary Examiner*—Jose L. Couso
(74) *Attorney, Agent, or Firm*—Kramer, Levin, Naftalis & Frankel LLP

(57) ABSTRACT

This invention provides a method of leveling an image of a non-uniform background. The method uses all or a portion of the image data from the original image and mathematical algorithms to construct a model image that reflects the non-uniform background of the original image and subtract the model image from the original image to generate an image with a more uniform background. This invention also provides computer software for performing the methods of the invention.

32 Claims, 7 Drawing Sheets

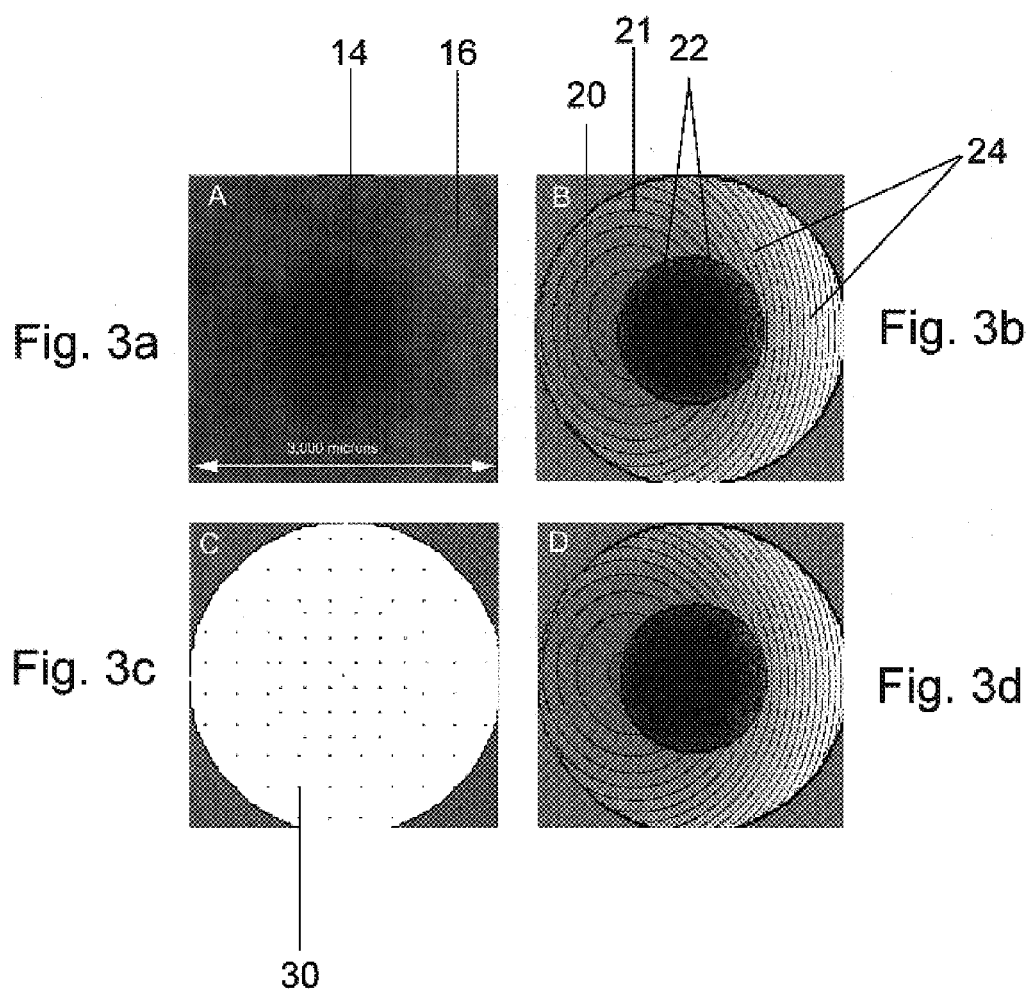

Fig. 4a
Fig. 4b
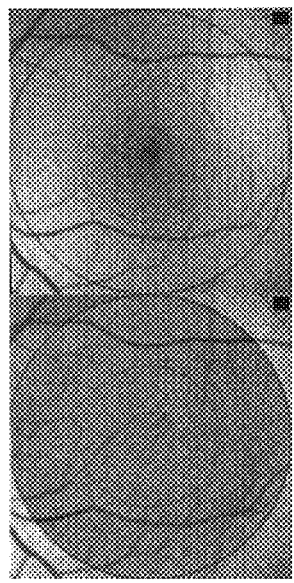
Fig. 4c
Fig. 4d

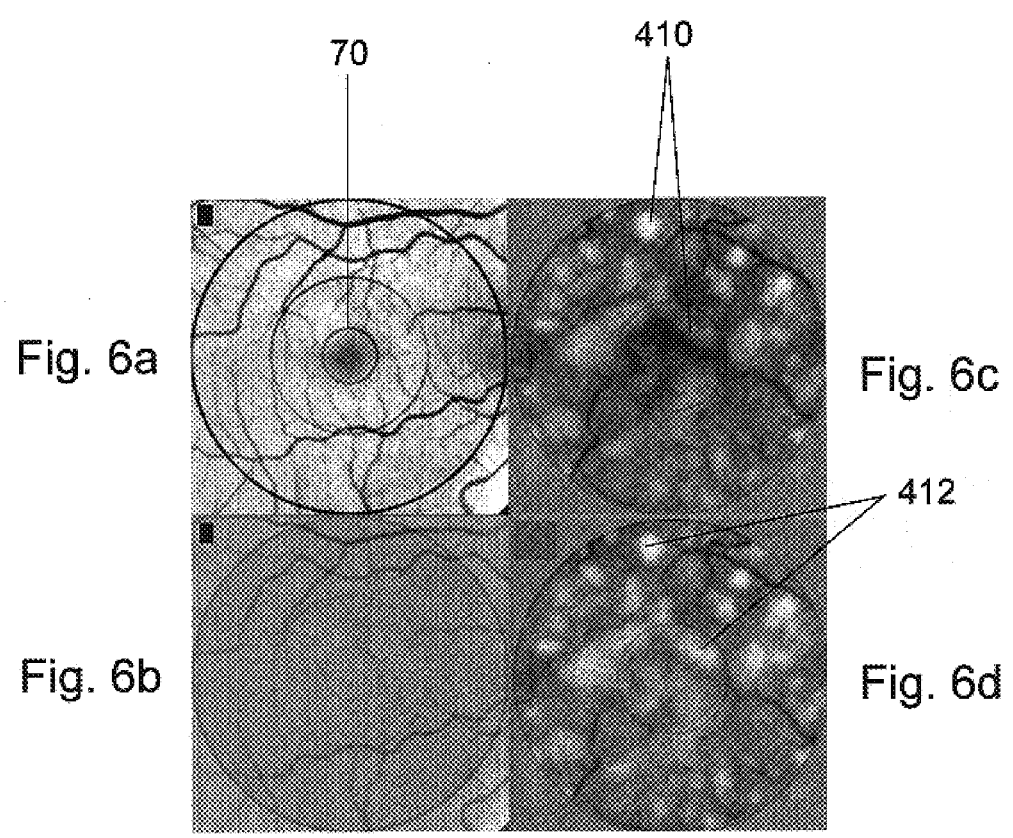

ENHANCING IMAGES SUPERIMPOSED ON UNEVEN OR PARTIALLY OBSCURED BACKGROUND

BACKGROUND OF THE INVENTION

Digital or conventional film-based photographic images of medical samples are often analyzed for the purposes of diagnosis. The images are examined for abnormal appearances and structures, lesions and other signs of pathological changes. The pathological characterization may be based on intensity, color, size, shape, or any combination of these characteristics. It is essential that characterization of pathological characteristics is precise in order to diagnose the underlying disease correctly. Furthermore, it is often desirable to monitor the changes in the appearance of lesions to determine the progression of diseases or the results of treatments. However, interpretation of images of medical samples is difficult when lesions or anatomical structures are superimposed on a background that is not even in intensity or one that is partially obscured.

Of all the organs of the body, the eye presents a unique challenge as far as diagnosis of disease is concerned. It is usually not possible to take samples from the delicate tissues inside the eye because this could be detrimental to vision. Fortuitously, many structures inside the eye can be visually observed through the transparent cornea at the front of the eye using a variety of diagnostic instruments. This is especially true for determining the condition of the retina that is located in the back of the eye, directly opposite the transparent cornea, and which is the main structure where images essential to vision are formed.

Present characterization of retinal lesions is manual and in many cases subjective, and attempts at automated and computerized analysis have provided very limited results so far. Manual analysis relies on trained observers who must master the subtleties of the intensity, geometry, and color characteristics of retinal lesions. A significant complication in evaluating these lesions is the fact that they are present on a background that is not uniform, but varies in color or intensity. This non-uniform background makes the same lesion appear lighter or darker, or changes its apparent size or geometry, depending where on the retina it is located. This unevenness is caused by variability of the optical characteristics of the adjoining retinal anatomic structures. Misinterpretation of these lesions may lead to incorrect diagnosis.

Tracking small changes is important in cases where the effects of drug therapy or laser surgery have to be evaluated to provide guidance as to their suitability. Manual analysis only provides quantification of pathology on a rough scale. Furthermore, determining small changes is often difficult if not impossible.

Progressive loss of vision has many causes. In the case of age-related macular degeneration (AMD), lesions such as drusen and Geographic Atrophy (GA) are mostly present on the macula, but may be present in other parts of the retina as well. Drusen are yellowish-white subretinal deposits that often have poorly defined borders. GA lesions are hypopigmented areas that are darker than the background and often present themselves as complex shapes on photographs and autofluorescent (AF) images. They appear as regions of varying size and color when examined using any one of a variety of ophthalmologic diagnostic instruments.

There are many other retinal diseases besides AMD, and all of these are characterized by unique lesions that may be present on the macula or on other parts of the retina. Analysis of these may also be facilitated by our methods.

A number of ophthalmologic diagnostic instruments may be used to determine the extent of retinal pathology. One such instrument is the scanning laser ophthalmoscope (SLO). It uses monochromatic laser light and confocal optics to image the retina in a number of modalities and provides an output in the form of monochromatic digital images. Evaluation of these images is complicated by the fact that in most modes of employing this instrument the retinal background is uneven. When this instrument is used in the AF mode, typically the normal macular background is darker (hypofluorescent) in the center and lighter (hyperfluorescent) away from the center. This causes identical areas of pathology to appear darker in the hypofluorescent center and brighter in the hyperfluorescent portions of the macula.

Another instrument is the fundus camera. It is used to photograph the retina using white light provided by a flash lamp. The resulting image is a color photograph, usually in the form of a 35 mm slide. On these images GA appears as reddish or hypopigmented patches of varying size superimposed on a pink background. These lesions are evaluated by trained technicians who determine the area and number of drusen or GA based on their subtle differences in size, number, or color and then assign a grade to these lesions. In spite of the extensive amount of training and experience, precise quantification is rarely possible and errors between trained graders are common.

There has been continued interest in the use of digital techniques for automated quantification of macular pathology, particularly drusen and GA. The system of manual classification of patients by stage of AMD based on painstaking analysis of drusen size, number, area, and morphology is labor intensive and costly, and there is increasing interest in developing automated methods to replace the manual ones.

Unfortunately, despite some progress, none of the automated methods developed so far have gained widespread use. A major obstacle is the non-uniform background that prior methods have so far been unable to deal with. For example, some automated methods sometimes incorrectly interpreted perivascular structures exhibiting bimodal distributions as coming from perivascular drusen. In other cases, large areas of background were included due to incorrect choices of threshold. These sources of error required many operator interventions to correct. The resulting methods were capable of good reproducibility, but were too tedious for general use. Hence, for almost two decades the limiting factor was not the complexity of computer algorithms, but the fact that the methods themselves were tied to local reflectance calculations. For example, for drusen segmentation, the determination of the area of this pathological feature is based on specific characteristics or patterns that distinguish it from the background. Generally, a post-processing step is necessary to correct errors or enlarge incompletely segmented drusen to achieve acceptable accuracy. Additionally, these methods are based on segmentation by local histograms and threshold techniques that have serious deficiencies.

Still other methods use other morphological operators or vary local histogram criteria for threshold choice to try to correct for deficiencies related to segmentation. These criteria may involve kurtosis or skewness. However, no matter how many histogram-based criteria are employed for local segmentation, widely different combinations of image features (drusen and background) can yield the same histogram.

An extreme example of this is where regions that are either all background or all drusen yield the same mesokurtic nonskewed distribution. The solution to this has been a morphological dilation operator, which is intended in all drusen cases to distort the local histogram by reintroducing background and thereby improve threshold recognition. Unfortunately, this artificial operator does not always perform as intended. What is needed are methods to efficiently generate uniform backgrounds so that precise measurement of images can be attained.

SUMMARY OF THE INVENTION

This invention provides a method of leveling an image of a non-uniform background, the method comprising the steps of: obtaining pixel data of a first image of a non-uniform background; constructing a second image by applying a mathematical algorithm to the pixel data of the first image, wherein such second image reflects the non-uniformity in the background of the first image; and subtracting the second image from the first image to generate a processed image.

In another aspect, this invention provides a method of leveling an image of non-uniform background, the method comprising the steps of: obtaining pixel data of a first image of a non-uniform background; dividing the first image into multiple regions of different intensities; constructing a segment image for each region by applying a mathematical algorithm to the pixel data of the region, wherein such segment image reflects the non-uniformity in the background of the region; combining the segment images to form a second image; and subtracting the second image from the first image to generate a leveled image.

In another aspect, this invention provides a method of leveling an image with non-uniform background, the method comprising the steps of: obtaining pixel data of a first image with a non-uniform background; segmenting the pixels of the first image into at least two groups manually or using a mathematical algorithm; constructing a second image by applying a mathematical algorithm to one of the segmented pixels group of the first image, wherein such second image reflects the non-uniformity in the background of the first image; and subtracting the second image from the first image.

In another aspect, this invention provides a method of leveling an image with non-uniform background, the method comprising the steps of: obtaining pixel data of a first image with a non-uniform background; selecting two or more regions of the first image; constructing a segment image for each region by applying a mathematical algorithm to the pixel data of the region, such segment image reflects the non-uniformity in the background of the region; combining the segment images to form a second image; subtracting the second image from the first image to create a third image; segmenting the pixels of the third image into at least two groups manually or using a mathematical algorithm; constructing a fourth image by applying a mathematical algorithm to one group of the segmented pixels of the third image, wherein such fourth image reflects the non-uniformity in the background of the third image; and subtracting the fourth image from the third image.

In another aspect, this invention provides a method of leveling an image with non-uniform background, the method comprising the steps of: obtaining pixel data of a first image with a non-uniform background; selecting two or more regions of the first image; segmenting the pixels of each region into at least two groups manually or by using a mathematical algorithm; constructing a segment image for each region by applying a mathematical algorithm to at least one group of the segmented pixels of the first image in each region, such segment image reflecting the non-uniformity in the background of the region; combining the segment images to form a second image; subtracting the second image from the first image to create a third image; segmenting the pixels of the third image into at least two groups using a mathematical algorithm; constructing a fourth image by applying a mathematical algorithm to one group of the segmented pixels of the third image, wherein such fourth image reflects the non-uniformity in the background of the third image; and subtracting the fourth image from the third image.

In another aspect of this invention, the mathematical algorithm used to construct the second image is a quadratic polynomial composed of six coefficients.

In another aspect of this invention, the first image is divided into regions by manual selection. In yet anther aspect of this invention, the first image is divided into regions automatically based on normative statistical data.

In another aspect of this invention, pixel data of the original image is segmented by a mathematical algorithm applying the Otsu method.

In a further aspect of this invention, the mathematical algorithm is applied to only a portion of the pixel data of the first image or one of the regions of the first image to construct the entire second image.

In a further aspect of this invention, a method of this invention comprises a further step of smoothing the second image along the boundaries between regions using a mathematical algorithm.

This invention also provides software for carrying out the methods of the invention.

Additional aspects of the present invention will be apparent in view of the description which follows.

BRIEF DESCRIPTION OF THE FIGURES

FIG. 3a. is a digital AF image of the macula.

FIG. 3b. is a two-zone model of the macula shown in FIG. 3a.

FIG. 3c. is an area of the macula with a set of dots.

FIG. 3d. is a two-zone model of the macula reconstructed from the set of dots shown on FIG. 3c.

FIG. 4a. is a digital AF image obtained with the SLO of a normal fundus showing the central region exhibiting uneven intensity.

FIG. 4b. is a leveled digital AF image after the model has been subtracted from the original image shown in FIG. 4a.

FIG. 4c. is a digital AF image of the macula obtained with the SLO showing hyperfluorescent lesions, the irregularly spaced light spots.

FIG. 4d. is a leveled digital AF image of the macula showing hyperfluorescent lesions which are now more distinct in appearance.

FIG. 5b. is a two-zone model of the macula shown in FIG. 5a.

FIG. 6a. is a digitized fundus camera image of a normal fundus showing the central region exhibiting uneven intensity.

FIG. 6b. is a leveled digitized fundus camera image after the model has been subtracted from the original image shown in FIG. 6a.

FIG. 6c. is a digitized fundus camera image of the macula obtained with the SLO showing drusen.

FIG. 6d. is a leveled digitized fundus camera image of the macula showing drusen which are now more distinct in appearance.

DETAILED DESCRIPTION OF THE INVENTION

Figure 1A:
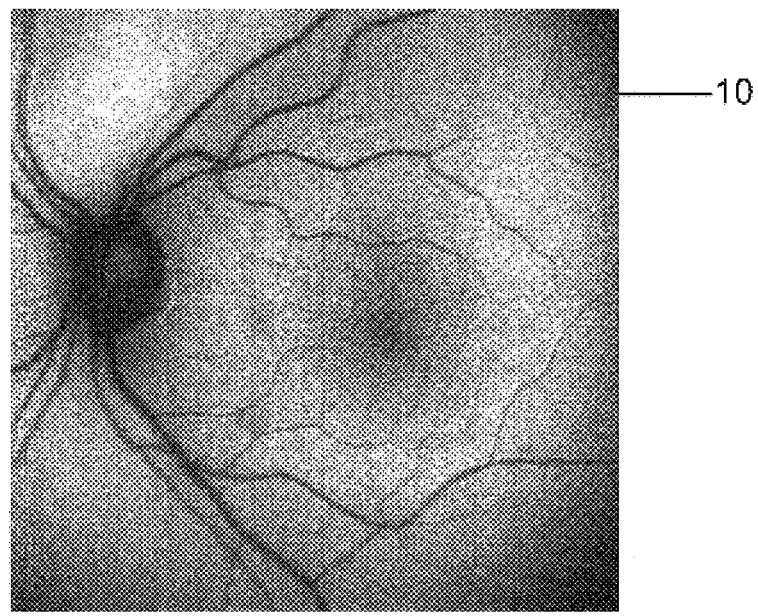
FIG. 1a. is a digital AF image obtained with the SLO of a normal retina showing the central region exhibiting uneven intensity.

This invention provides a method to enhance details of images superimposed on background that is of uneven intensity, color, or channel gray level, or one that is partially obscured. Images that undergo enhancement by the methods described herein are better suited to subsequent automated analysis. A wide range of applications is contemplated for this invention, including for surveillance, environmental, or biomedical uses. One specific application that is envisioned is for facilitating medical diagnosis by enhancing details of objects in medical images, such as pathological lesions.

The invention describes a method to closely characterize and model the uneven intensity of the background on which pathology is superimposed. It transforms background of uneven intensity into one of approximately constant intensity, a process that results in a so-called "leveled" background. This transformed background is then used to clarify the pathology for medical diagnosis. The background model is defined mathematically by algorithms derived on the basis of information obtained from images of normal non-pathological samples and/or pathological samples.

Furthermore, this invention describes a method of reconstructing missing background in an image that contains pathological features that obscure part or even most of the background. This reconstruction is based on obtaining pixel gray scale levels and location from regions as small as a few pixels located on areas where pathology is absent, and from this data reconstructing the entire background. To facilitate automated quantification and evaluation of the pathology, this reconstructed background can then be subtracted from the original image, thus providing a leveled image that much more distinctly reveals the features of the pathology for subsequent segmentation. For example, the invention significantly improves definition of edges and sharpness of lesions against the background when additional methods such as thresholding are applied.

This invention is particularly useful in enhancing images of the eye, but is not limited to such use. It can be used to level the background and enhance the image of any image with non-uniform background. Other uses of this invention may involve enhancing nuclear magnetic resonance (NMR) images where the uneven field from the magnetic coils causes the background of the image to be of uneven intensity. Still another use may be in analysis of endoscopy images where uneven lighting changes the appearance of pathological lesion images. Still other uses may involve images of mammograms.

Advantageously, the invention provides a method of reconstructing a background in cases where the original image is partially obscured, for example by pathological lesions in medical images. This aspect of the invention makes it possible to construct the entire background of an image that is partially obscured by pathological lesions from samples taken from parts of the image that are not obscured by the lesions. The reconstructed background is then subtracted from the actual image, changing the background from non-uniform to one that is more uniform. This enhances the appearance of the pathology contained in the samples, allowing further automated analysis and quantification to be performed more accurately than possible by other methods.

One embodiment of this invention is directed at facilitating evaluation and diagnosis of the visual system. Specifically it can be applied for analysis of the retina, especially its central part called the macula, the region of the eye that is most critical for normal vision. When imaged by a variety of ophthalmologic instruments commonly used for diagnosis, the intensity and color of the normal, non-diseased macula appears uneven due to its complex anatomy. When a pathological lesion is present on the macula, it is often difficult to detect and characterize it automatically because its apparent brightness differs depending where it is located.

The invention is based on the observation that variation in the intensity of the background of an image can be modeled by a mathematical algorithm. Using the mathematical model and image data from an original image, a second image that reflects the non-uniform background of the original image is constructed. The second image is then subtracted from the original image to generate an image with a more uniform background.

In one aspect of the invention, a method of the invention comprises the following steps: obtaining pixel data from an original image that has a non-uniform background, using a mathematical algorithm that best fits the pixel data of the original image to construct a second image, and subtracting the second image from the original image to generate an image with a more uniform background.

The original image may be digital image acquired by digital camera or other device. Alternatively, the original image may be traditional film-based photograph, which is scanned and digitized. Essentially, any device that can generate digital or digitized images may be used. For each pixel of the digital or digitized image, its position and intensity value are obtained. In one embodiment, the position of a pixel on an image is represented by its coordinates (x, y), intensity value of a pixel is shown as one of 256 gray levels. The original image may be monochromatic or color. If the original image is a color image, the color image may be digitized in three basic color channels, red, green and blue. It may also be digitized in other color channels or combination of channels. Such other color channels may include cyan, magenta, yellow, black and others. Each color channel has 256 gray levels.

The Quadratic Polynomial Model Algorithm

In one embodiment, a quadratic polynomial is used as the mathematical algorithm to construct the second image from the pixel data of the first image. In the quadratic model, the general quadratic polynomial Q with respect to a central reference point $(x_0, y_0)$ is defined by six coefficients a,b,c,d,e,f.

$$Q(x,y)=a(x-x_0)^2+b(x-x_0)(y-y_0)+c(y-y_0)^2+d(x-x_0)+e(y-y_0)+f$$

Pixel data of the first image determines the polynomial Q that is the best fit to the first image. This polynomial Q is then used to construct the second image. The quadratic polynomial is chosen because the level sets defined by Q(x, y)=constant are conic sections, of which ellipses are one. It is observed that the background intensity level of certain images such as those of the fovea of the eye is defined by a constant gray level most closely resemble ellipses.

Individual pixels are represented by their (x, y) coordinates in the plane. The set of coordinates (x, y) is taken to be a discrete set of (x(i), y(j)). Image data are gray scale values Z(i, j) or color channel values. Let X[[i]] and Y[[j]] represent the quantities (x(i)−$x_0$) and (y(j)−$y_0$). To find the Q that best fit the first image, the least square fitting method is used. According to this method, the quantity to be minimized is the sum S of $(Q(x(i),y(j))-Z(i,j))^2$ over all (i,j) in the data set to be fit. The polynomial Q may be fit with all or a portion of the pixel data of the first image. The least square fitting method is well-known to the skilled artisan. Commercially available software such as MATHEMATICA can perform least square fitting. One may also develop customized software to do the least square calculation. Regardless, one is not limited to using the least square fitting method to determine the best fit. A person skilled in the art may readily determine other fitting methods to determine the best fit. Once the best-fit Q is determined, the second image is constructed where the intensity value of a pixel at position (x, y) is Q(x, y).

A leveled image $Z_1$ is created by subtracting the second image from the first image using the following formula:

$$Z_1 = Z - Q + C$$

wherein, Z is the first image, Q is the second model, C is a constant included in the formula to adjust the total brightness of the image. The exact value of C is not critical. It just resets the mean value of the image to a gray level which is visible to the human eye and prevents negative values.

In a further aspect of the invention, only a portion of the pixel data of the original image are used to fit the quadratic polynomial Q for the determination of the coefficients. Once the coefficients are determined, Q(x, y) may be calculated for any pixel, whether or not the position and intensity value of such pixel is used to fit the quadratic. Therefore, a complete model image may be constructed using digital image data from a portion of the pixels in the original image.

In a further aspect of the invention, the quadratic polynomial algorithm fitting and subtraction of the constructed image is iterated. In the iterative process, Zi from the previous process is the original image to be fit and subtracted from. The next leveled image Zi+1 is defined as $$Zi+1 = Zi - Qi + C$$

The process may be iterated a number of times at the user's option, until a desired background is achieved.

In a further aspect of the invention, two or more regions R of the original image are selected. Each region is separately fit with a quadratic polynomial Q and a unique set of coefficients is determined for the quadratic polynomial Q for each region. All or a portion of the pixel data in each region is used for determining the quadratic polynomial Q. A segment image is constructed using the best-fit Q for each region. All segment images are combined together to form a second image. The second image is then subtracted from the original image to generate a more leveled image. The steps of this method may be iterated to achieve better image leveling result.

The regions are selected based on intensity distribution of the image. The image is divided into two or more regions of different intensity levels, wherein pixels of relatively similar intensity are kept in the same region. The regions can be any shape and size. Generally, the categories of regions, rectangular grid, annular, angular subdivision or other shapes, would be determined by the type and geometry of the image to be analyzed. The regions are selected either manually by the user or automatically using statistically determined parameters. A user may visually separate an image into two or more regions of different intensity levels.

In one embodiment of the invention, the regions are selected automatically using thresholds determined from normal samples and statistical tests. To choose suitable thresholds for selecting the regions for a given type of image, we require a normative database of normal images, which have typical background variation of such type of image but do not have pathology. A statistically significant number of normal images are analyzed manually by an experienced technician to establish a normative database. The normative database contains information relating to the typical intensity divisions and distribution of the same type of image. Once the type of subdivision is chosen, scale parameters for the mesh can be chosen by statistical criteria. The simplest example would be a rectangular mesh, but the same principle would apply to a mesh defined by circles of various radii and angular subdivisions. Coarser meshworks would be tested first, starting with a single subregion for the entire image. If the test is met for a mesh component, it is included in the final subdivision of the image. If not, that component is subdivided and the subregions retested. For example, if the component is an annulus, it could be subdivided into two subannuli by radii, or into quadrants by angle. The subcomponents are again tested, and so on.

The statistical test for inclusion of a region in the final subdivision: Let D be the smallest desired net relative gray scale difference between an object to be segmented and local background (i.e., D is the desired sensitivity of the final algorithm). The gray scale mean M, standard deviation S of M and histogram $H_0$ are calculated for all images in the database for the region in question. Define the modified histogram H to include only those values between the 5th and 95th percentile of $H_0$ for each image. Let R be the net range of H. If Max{R} over all images in the database is less than D, then the region R meets the test for inclusion.

In one embodiment, we have extended the quadratic polynomial model of photographic background to the entire macula (6000-micron diameter regions) using a 1000 micron central disc, two annular regions (1000 to 2000 and 2000 to 3000 microns), and two further annular regions (3000 to 4500 and 4500 to 6000 microns), the latter regions divided into four quadrants (8 regions total) for the annulus from 3000 to 6000 microns. The resulting 11-region, 66 coefficient model (with appropriate radial and angular cubic spline interpolations at interfaces) is our current model of macular background.

In another embodiment, the image of the macula is divided into two regions, including an inner circular region centered in the macula and an outer annular region surrounding such inner region.

In a further aspect of the invention, the segment images along the boundary between two regions are smoothed by a mathematical algorithm. After fitting the mathematical model to the data set in each region, define interpolations at boundaries with sigmoidal radial or angular cubic splines to smooth boundary discontinuities as follows. Let the boundary of two regions be defined by a function E such that E=1 on the boundary, E<1 in region 1 and E>1 in region 2. E could be a radius function or an angular function. Let the segment model functions determined for the background in these regions be Q1 and Q2. Let eps and delt define a boundary zone for E between 1−eps and 1+delt. In this boundary zone, interpolate between the functions Q1 and Q2 by defining functions $t = (E+eps-1)/(delt+eps)$ $f = 3\ t^2 - 2\ t^3$ Then on this boundary zone let the model Q take the value $Q = (f*Q2 + (1-f)*Q1)$ Q will be set to Q1 on the remainder of region 1 and Q2 on the remainder of region 2.

In another aspect of the invention, the pixels of an image are segmented into two or more groups either manually or using a mathematical algorithm. In one embodiment, "dots" or pixel subsets on the image are manually picked by the user under direct visual guidance. In another embodiment, pixel subsets are selected by a mathematical algorithm based on the intensity levels of the pixels, wherein pixels of similar intensity levels are segmented in the same group. In one embodiment, the image data is divided into two sets: background data and the remaining data correspond to the objects of interest. In another embodiment, the image data is divided into three sets: background data, objects of interest, and a set of other structures that are to be excluded both from background and objects of interest. For example, in retinal images, the retinal vessels are usually dark objects that are neither background nor the pathological objects of interest. The pixels can be segmented into a plurality of groups depending on the background non-uniformity of the image. The pixels segmented into one group are not necessarily physically located in one continuous region. Most likely, they are not physically located in one continuous region.

In a preferred embodiment, the mathematical algorithm for segmentation is the Otsu method, which is an automatic histogram based thresholding. The Otsu method is as follows:

Let the pixels of a given region of the image be represented in L gray levels [1, 2, . . . , L]. The histogram [n1, . . . , nL], with $N = \Sigma n_i$ is normalized as a probability distribution $$p_i = \frac{n_i}{N}, \text{ where } p_i \geq 0, \sum_{i=1}^{L} p_i = 1$$

Suppose the pixels are divided into two classes $C_0$ and $C_1$ (background and objects of interest) by a threshold at level k. $C_0$ denotes pixels with levels [1, . . . , k] and $C_1$ denotes pixels with levels [k+1, . . . , L]. Then $$\omega(k) = \sum_{i=1}^{k} p_i \text{ and } \mu(k) = \sum_{i=1}^{k} i p_i$$

are the zero$^{th}$- and the first-order cumulative moments of the histogram up to the k$^{th}$ level, respectively, and $$\mu_T = \mu(L) = \sum_{i=1}^{L} i p_i$$

is the total mean of the original image. Let the cumulative probabilities of class occurrence and the class mean levels, respectively, be $$\omega_0 = \sum_{i=1}^{k} p_i = \omega(k) \qquad \mu_0 = \sum_{i=1}^{k} i p_i / \omega_0 = \mu(k)/\omega(k) \text{ and}$$

$$\omega_1 = \sum_{i=k+1}^{L} p_i = 1 - \omega(k) \qquad \mu_1 \sum_{i=k+1}^{L} i p_i / \omega_1 = \frac{\mu_T - \mu(k)}{1 - \omega(k)}$$

A discriminant criterion that measures class separability is used in order to evaluate the "goodness" of the threshold (at level k)

$\eta = \sigma_B^2 / \sigma_T^2$ where $\sigma_B^2 = \omega_0(\mu_0 - \mu_T)^2 + \omega_1(\mu_1 - \mu_T)^2$ $= \omega_0 \omega_1 (\mu_1 - \mu_0)^2$ and $$\sigma_T^2 = \sum_{i=1}^{L} (i - \mu_T)^2 p_i$$

are the between-class variance and the total variance of levels, respectively. Then the problem is reduced to the finite search for the threshold k between 1 and L that maximizes the between-class variance. The optimal threshold k* can be determined by maximizing $\sigma_B^2$ explicitly using:

$$\sigma_B^2(k) = \frac{[\mu_T \omega(k) - \mu(k)]^2}{\omega(k)[1 - \omega(k)]}$$

In the case where there are three classes $C_0$, $C_1$ and $C_2$ (background, objects of interest, and other objects, in any permutation), defined by pixels with levels [1, . . . , k], [k+1, . . . m], and [m+1, . . . L], respectively, we maximize the total between-class variances $\sigma_B^2 = \omega_0(\mu_0-\mu_T)^2 + \omega_1(\mu_1-\mu_T)^2 + \omega_2(\mu_2-\mu_T)^2$ where $\omega_i$ and $\mu_i$ are the zero$^{th}$—and the first-order cumulative moments of the histogram for class Ci as defined above. The solution is found by the finite search on k for k=1, . . . , L−1 and m for m=k+1 to L for the maximum of $\sigma_B^2$.

This procedure results in an initial segmentation by the threshold k (or thresholds k and m) in each region into the two (or three) desired classes. In particular, for each region we now have an initial choice of background for input to the mathematical background model. The model could be based on any of the function sets listed previously. The background segmentation and quadratic fitting method can be applied repeatedly and sequentially to process an image.

The process achieves better results by iterating the segmentation and quadratic modeling method. Let Qi be the model determined as above from the image data Zi. No further operator intervention is required, since the new choice of background input will be determined automatically by the Otsu method. The process is even simpler, because after the initial leveling (including segmentation and quadratic modeling), the Otsu method is applied to the histogram of the entire leveled image to find the next background threshold(s), rather than to the individual regions. The next background selection is input to the model and the next leveled image Zi is defined as $$Zi=Zi-1-Qi-1+C$$

The process terminates after a pre-determined number of steps or when the net range of the model Qi reaches a set target (that is, the range is sufficiently small, indicating that the new background is nearly flat). The Otsu threshold defined above for the final leveled image then determines the final segmentation of objects of interest.

In a further aspect of the invention, pixel data from one segment defining the background of the image is used to fit the quadratic polynomial. The quadratic polynomial Q determined using data from one segment is used to construct an image for the entire area of the original image. For example, in retinal images, only the background area, not the pathological area or the retina vessels, of an image, is used to fit the mathematical model. Then the entire background of the image is constructed by the mathematical model and subtracted from the original image.

In a further aspect, the invention provides a method of image leveling using a combination of the region selection, automatic segmentation and quadratic modeling process. The method comprises the following steps: a) obtaining pixel data of a first image with a non-uniform background; b) selecting two or more regions of the first image; c) segmenting the pixels of each region into at least two groups using a mathematical algorithm, constructing a segment image for each region by applying a mathematical algorithm to at least one group of the segmented pixels of the first image in each region, such segment image reflecting the non-uniformity in the background of the region; d) combining the segment images to form a second image; e) subtracting the second image from the first image to create a third image; f) segmenting the pixels of the third image into at least two groups using a mathematical algorithm; g) constructing a fourth image by applying a mathematical algorithm to one of the segmented pixels group of the third image, wherein such fourth image reflects the non-uniformity in the background of the third image; and h) subtracting the fourth image from the third image. Any one or more steps of the method may be iterated to achieve better results of image leveling.

In a further aspect, this invention provides computer software for executing the methods of this invention, such software is capable of carrying out the following tasks: a) receiving a data array, b) fitting a quadratic polynomial function Q(x, y) to the data array, determining the coefficients of the function, generating a new data array using the Q(x, y) function, and c) subtracting the new data array from the original data array.

In a further aspect, this invention provides computer software for executing the methods of this invention, such software is capable of carrying out the following tasks: a) receiving a data array, b) dividing the data array into subsets using the Otsu method, statistical parameters or a combination of the two methods, c) fitting a quadratic polynomial function Q(x, y) to the subsets, d) combining the subsets to form a new data array, and e) subtracting the new data array from the original data array.

In a further aspect, this invention provides computer software for executing the methods of this invention, such software is capable of carrying out the following tasks: a) receiving a data array, b) dividing the data array into regions, c) dividing the data in each region into subsets using statistical parameters, d) fitting a quadratic polynomial function Q(x, y) to the subsets in each region to create a segment image, each segment image reflecting the non-uniformity in the background of the region, e) smoothing out the segment image along the boundaries between regions, f) combining the segment images to form a new data array, and g) subtracting the new data array from the original data array.

In a further aspect of the invention, an original image may be pre-processed by traditional image filtering method to improve the quality of the image for background leveling.

The present invention is described in the following Examples, which are set forth to aid in the understanding of the invention, and should not be construed to limit in any way the scope of the invention as defined in the claims which follow thereafter.

DETAILED DESCRIPTION OF THE PREFERRED EMBODIMENTS

EXAMPLE 1

Transforming Autofluorescence (AF) Images Obtained with the SLO

Image Acquisition

We begin with a digital monochromatic image acquired by the SLO. When using this instrument, the retina is illuminated by laser light and some of the microscopic anatomical structures absorb this light more than others. As a result the retina presents itself as having uneven fluorescence exhibiting a range of gray scale levels.

Figure 1B:
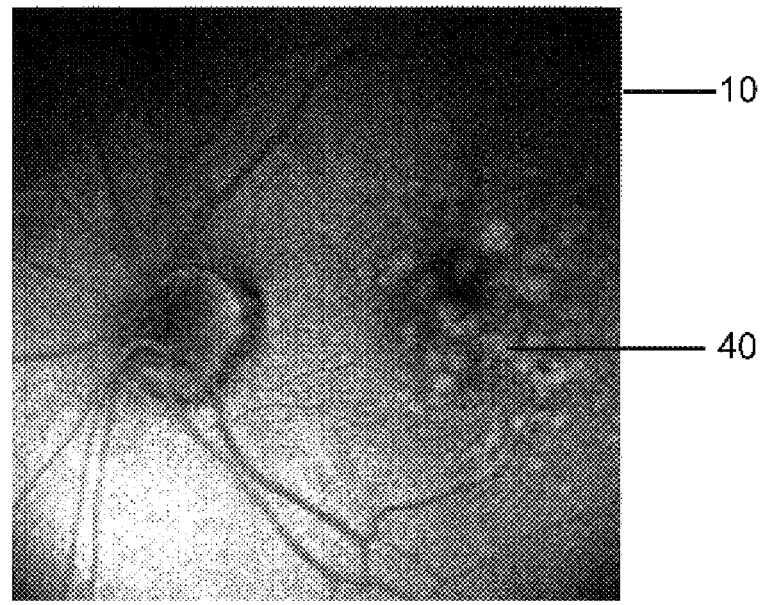
FIG. 1b. is a digital AF image obtained with the SLO with pathology (hyperfluorescent lesions) in the central region.

An SLO image 10 is shown on FIG. 1a and 1b. It can be from a normal subject as shown on FIG. 1a, or from a patient whose retina contains pathology 40 as shown on FIG. 1b.

Figure 2:
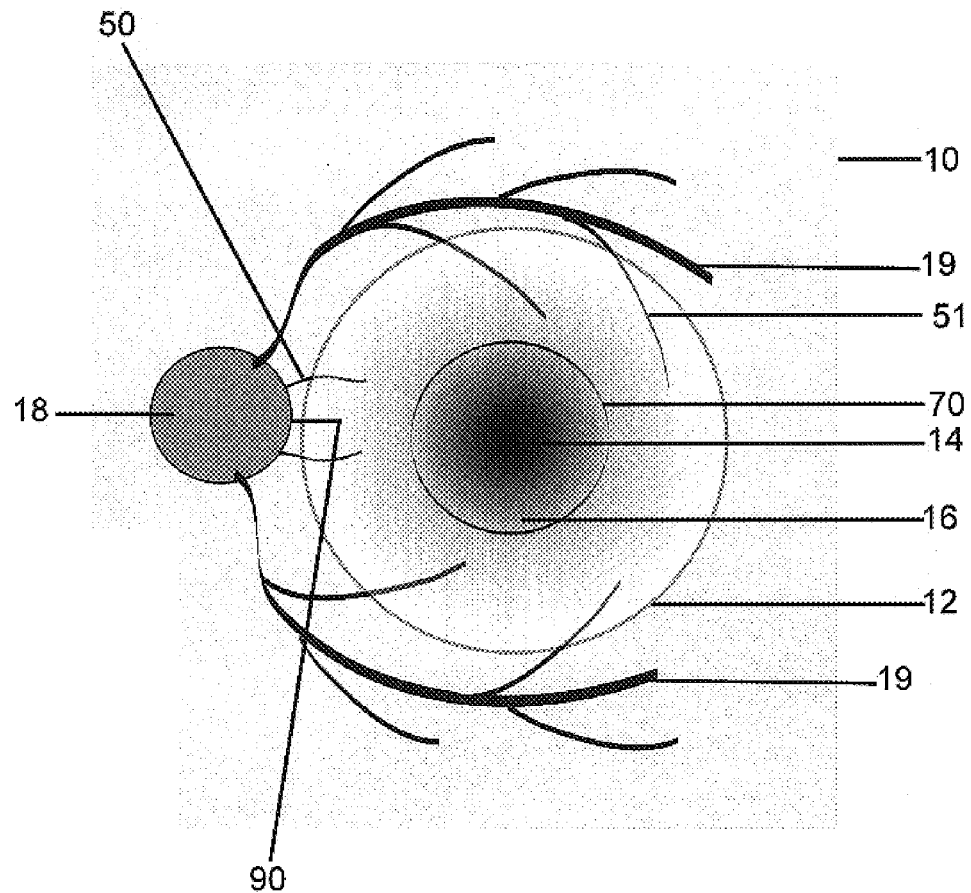
FIG. 2. is a diagram of the retina showing major (macroscopic) anatomical features.

Some of the anatomical features contained on such an image are shown diagrammatically on FIG. 2. These are major (macroscopic) features such as the optic nerve 18, the major retinal blood vessels called the arcades 19, and smaller vessels 50 that emanate from the optic disc and branch vessels 51 that emanate from the arcades.

The central part of the image contains the fovea and the macula. The fovea, indicated by 70, is about 1,500 microns in diameter and is centered on the point of lowest fluorescence (the hypofluorescent center, the darkest area of the image), and is devoid of any major anatomical features. The gray scale levels of the fovea extend from the hypofluorescent center 14 to the lighter (hyperfluorescent) periphery 16. The macula 12 is a larger area, some 5,000 microns in diameter, and also displays progressively increasing gray levels (becomes lighter) in the outward direction.

The uneven reflectance of the fovea and the macula is due to the unequal absorbance of light by the microscopic anatomical features specific to this region, mostly the lipofuscin and luteal pigment molecules contained in the cells that make up the retinal pigment epithelium (RPE) underlying the photoreceptors. These molecules, because of their microscopic size, are not visible on the SLO image.

Image Analysis

In this example all analysis is done on the fovea. However, this should not be construed as a limitation of this method. Areas outside the fovea, such as the macula, can also be analyzed using the principles disclosed herein.

Analysis of images is accomplished using computer and custom software that has been written specifically for this purpose. In addition, commercially available software for image processing and analysis can also be employed to supplement the custom software. For example, one such program is Adobe Photoshop (Adobe Systems Inc., San Jose, Calif.) that was used in the present example.

In order to perform the analysis, the image is imported from the SLO as a bitmapped file, each pixel consisting of one of 256 gray levels. This is followed by application of a filter imparting a Gaussian blur to remove noise in the image. This filter has no noticeable effect on larger image features or isobar patterns that will be described below.

To evaluate macular pathology we need to make two transformations (corrections) of this image: reconstruct the background in cases where it is partially obscured by pathological features, and level the background to enhance the appearance of these features against the background.

Two-Zone Mathematical Model of Macular Fluorescence

We begin by selecting an image from a subject whose fovea is normal (i.e., devoid of any macular pathology). The foveal region from such a patient is shown on FIG. 3A. This region shows hypofluorescence 14 and hyperfluorescence 16 as gradual transition of gray scale levels from darker to lighter as we proceed from the center of the fovea to the periphery. The gray level of each pixel recorded in a data array as a number between 0 and 255 (for a total of 256 values). The x and y coordinates of each pixel are also stored in the data array.

This is followed by constructing a mathematical model shown on FIG. 3b that is composed of two zones using data from a normal fovea, the inner region 22 of 750 microns in diameter and the outer region (annulus) 24 of 1500 microns in diameter. The data in each region, consisting of the gray level values for each pixel, are then fit with a quadratic polynomial. The gray levels are functions of their pixel coordinates (x, y) in the x-y plane. The general quadratic has the form:

$$q(x, y) = ax^2 + bxy + cy^2 + dx + ey + \text{constant}$$

This quadratic is fit by custom software employing least squares methods to the AF data set to optimize the six coefficients (a, b, c, d, e, constant). These functions are chosen because the level sets defined by q(x, y)=constant are conic sections, of which ellipses are one, and our observation shows that the foveal isobars 20 defined by one constant gray level most closely resemble ellipses. The resulting isobars are relatively wide in the outer annulus 24 but are fine in the inner zone 22.

In this model, two regions and two quadratics are employed. A central disc (inner region) 22 of 750-µm in diameter is taken as the inner region. The surrounding annulus 24 is the outer region. The inner region corresponds to a significantly more hypofluorescent section in most images and it exhibits a greater transition of the gray scale values. The outer region exhibits a lesser transition of gray scale values.

A quadratic q1 is fit to the data in the inner region and a second quadratic q2 to the data in the outer region (for a total of 12 coefficients). The smooth fits are displayed as contour graphics in a computer program. A commercial program such as Mathematica (Wolfram Research) can be employed for this purpose, but custom programs can also be written for this purpose. It should be noted that in FIGS. 3b and 3d the isobars 20 are separated by black lines 21. These lines have been artificially generated to illustrate the boundaries of the isobars 20, but they are in fact not part of the model.

Verification of the Model by the "Dots" Method—Reconstructing the Model from a Small Set of Data Points To verify that our model can be reconstructed from a small set of data points, a set of such points called "dots" is selected on image in FIG. 3a. These dots 30 are shown on FIG. 3c, and they comprise a small portion, about 2%, of the total number of pixels. Each dot contains at least one pixel, but can contain several pixels. These dots can also be subsets of the image containing a substantial portion of pixels. These data points are randomly located on the image, but their density typically is greater near the center (the inner region) and lesser on the periphery (the outer region).

These dots are then used to reconstruct the contour graph using the quadratic equation given above. The reconstructed contour graph, shown in FIG. 3D, has small errors with respect to the original shown on FIG. 3B, but is substantially the same. This validation is proof that we can reconstruct an accurate contour graph from a small set of dots.

Application of the Dots Method for Background Reconstruction

In one application contemplated for this invention a limited number of dots will make it possible to reconstruct a contour graph from an image where part of the image is obscured, for example by pathological lesions. This will be accomplished by choosing dots that are located in areas of the image that are not obscured.

In a typical case, a grid of dots will be selected from the two regions. For example, this grid may comprise 1.1% of the pixels in the outer region and 1.7% of the pixels in the inner region. The two-zone quadratic model is then fit to this grid of data, and this quadratic model will be used to level the image to make it more suitable for subsequent automated analysis.

A mathematical model of the background of a medical or other image can be reconstructed from representative dots or subsets of background data using other function sets as well. These function sets can include higher order polynomials, linear and affine transformations, Gaussians, exponentials, as well as the standard components of Fourier, Bessel, and Legendre series expansions (i.e., trigonometric functions, Bessel functions, and Legendre polynomials). The methods of fitting these function sets by least squares methods to known data sets are standard engineering applications. Our invention consists of reconstructing the background in cases where part of it is obscured by fitting such function sets in one or several regions to remaining dots or subsets of background data. We then subtract the resulting model of the background from the image to level the background, as described below. This allows for more accurate identification of the objects of interest, such as pathological lesions in a medical image for subsequent analysis, especially when applying automated methods such as thresholding.

Leveling the Background

The next step in image transformation according to our method is to level the background, i.e., render it uniform by removing the variations in gray scale values. This is accomplished by subtracting the model from the original image to provide a resulting image whose background is even. FIG. 4a shows an original AF image, FIG. 4b shows the same image after the background has been leveled using our methods, illustrating the uniformity of gray scale values of the background. In this image the entire macula has been leveled.

The practical application of this method is in the case where pathology is superimposed on the background. One such situation is illustrated on FIG. 4c where hyperfluorescent lesions of variable intensity and size are present on the fovea. Leveling the background using our method renders the hyperfluorescent lesions brighter and more distinct as illustrated on FIG. 4d.

EXAMPLE 2

Color Fundus Photographs

In order to transform color fundus photographs in such a way that pathology contained therein is enhanced for analysis, we employ methods similar to those applied to AF images described in Example #1 above, but with additional steps, designed to deal with the property of color that is characteristic of these images.

We begin by digitizing a color image obtained by the fundus camera, for example a slide, and saving this image as 24-bit TIFF file. This digitized image contains information in red, green, and blue channels (RGB) as well as 256 levels of intensity for each channel. It should be pointed out that for digitization other color channels or combinations of channels might also be generated, such as cyan, magenta, yellow, and black (CMYK). However, we will confine this example to the RGB channels only.

Correction for Non-Uniform Illumination

The next step is image correction for the large-scale variation that results from the non-uniform illumination that is characteristic of fundus photography. This initial procedure is required for transforming fundus photographs and should not be confused with background leveling, to which it is not related. Image correction is carried out independently on the color channel for each of the three colors, and the results are combined as a new RGB image. For image correction each channel is copied, blurred by a Gaussian blur having half-maximum radius of 535 micrometers, and then subtracted from the original channel with the following constant offset values: 195 for red, 125 for green, and 75 for blue. The color image is then recombined as a corrected color image. These offset values have been determined to be specific to the macula to produce a color-balanced, shading-corrected fundus image that is recognizable to the human eye.

Two-Zone Mathematical Model of Macular Reflectance

Figure 5A:
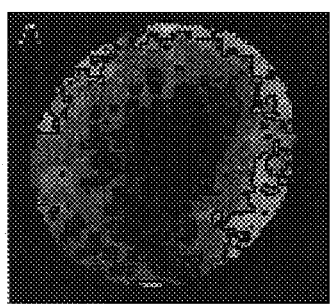
FIG. 5a. is a fundus camera image of the macula in the green channel.

Since certain retinal pathology imaged with fundus photography, such as drusen, have greater contrast in the green channel than in other channels or combinations of channels, the image is transformed by selecting it in the green channel only as shown on FIG. 5a. This image now contains about 15,300 data points, each corresponding to a pixel. The number of points is not a limitation; images of other sizes can be also analyzed by our methods. Each data point has x and y coordinates and a unique intensity level that is the equivalent of a gray scale level between 0 (white) and 255 (black), for a total of 256 intensity levels. However, in practice only a portion of the intensity range is contained in each image. In the example on FIG. 5a the intensity range in what would be the outer annulus contains 16 intensity level units that differ from each other by one unit.

Figure 5B:
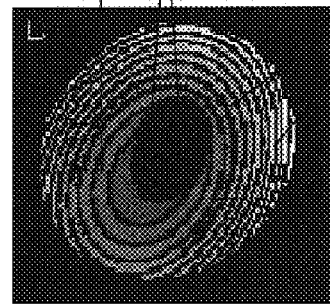

The next step is selecting a two-zone, 12-parameter quadratic fit to the data points (FIG. 5b) plotted as a contour graph composed of isobars 320. Each isobar is characterized by one gray level unit and each isobar's gray scale value differs by one unit from the adjoining one. These isobars tend to be wider for the outer annulus 322 than for the inner center 324.

The general quadratic that described these isobars has the form:

$$q(x,y)=ax^2+bxy+cy^2+dx+ey+\text{constant}$$

The pixel gray levels are considered to be functions of their pixel coordinates (x, y) in the x-y plane.

The inner center 324 for example can be modeled by an elliptic quadratic q1 with respect to a central reference point (x0, y0) having the form:

$$q1(x,y)=a(x-x_0)^2+b(x-x_0)(y-y_0)+c(y-y_0)^2+d(x-x_0)+e(y-y_0)+\text{constant}$$

The outer annulus 322 can be modeled by a second quadratic q2 having the same form, except for different coefficients.

Verification of the Model by the "Dots" Method

Figure 5C:
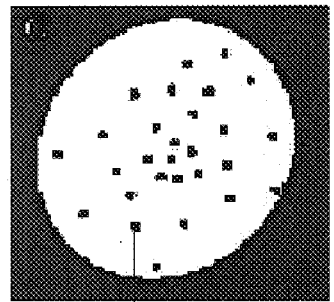
FIG. 5c. is an area of the macula with a set of dots.

To verify the accuracy of our method in this example, a set of data points (dots) 330, is selected that comprise about 2.2% of the total number of total data points. These data points are shown in FIG. 5c. These dots are randomly located on the green channel image shown on FIG. 5a, in such a way that their density is greater near the center and lesser on the periphery.

Figure 5D:
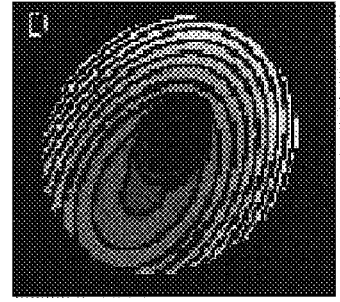
FIG. 5d. is a two-zone model of the macula reconstructed from the set of dots shown on FIG. 5c.

These data points are then used to reconstruct the contour graph. The reconstructed contour graph, shown in FIG. 5d, closely resembles the original contour graph shown on FIG. 5b, providing validation that we can reconstruct an accurate contour graph from a small set of dots.

Application of the Dots Method for Background Reconstruction

In one application contemplated in this invention a limited number of dots will allow us to reconstruct a contour graph from an image containing pathology that obscures part of the image. This will be accomplished by choosing dots that are located in areas of the image that are not obscured by pathology.

Leveling the Background

The next step in our method of image enhancement is to level the background, i.e., render it uniform by subtracting the model that was obtained by reconstructing the contour graph. This is accomplished by subtracting the model from the entire green channel to provide an image whose background is even (leveled). FIG. 6a shows an original image of a normal retina, FIG. 6b shows the same image after the background has been leveled illustrating the uniformity of gray scale values of the background. The circles on FIGS. 6a and 6b illustrate areas that are clinically important for diagnosis. This area may contain only the fovea 70, but other areas can also be analyzed.

The case where pathology such as drusen is superimposed on the background is illustrated in FIG. 6c where drusen 410 of variable intensity and size are present on the region of interest. After the background has been leveled, the drusen are brightened in areas that were formerly dark as illustrated on FIG. 6d, rendering the transformed drusen 412 brighter and more distinct.

Figure 7:
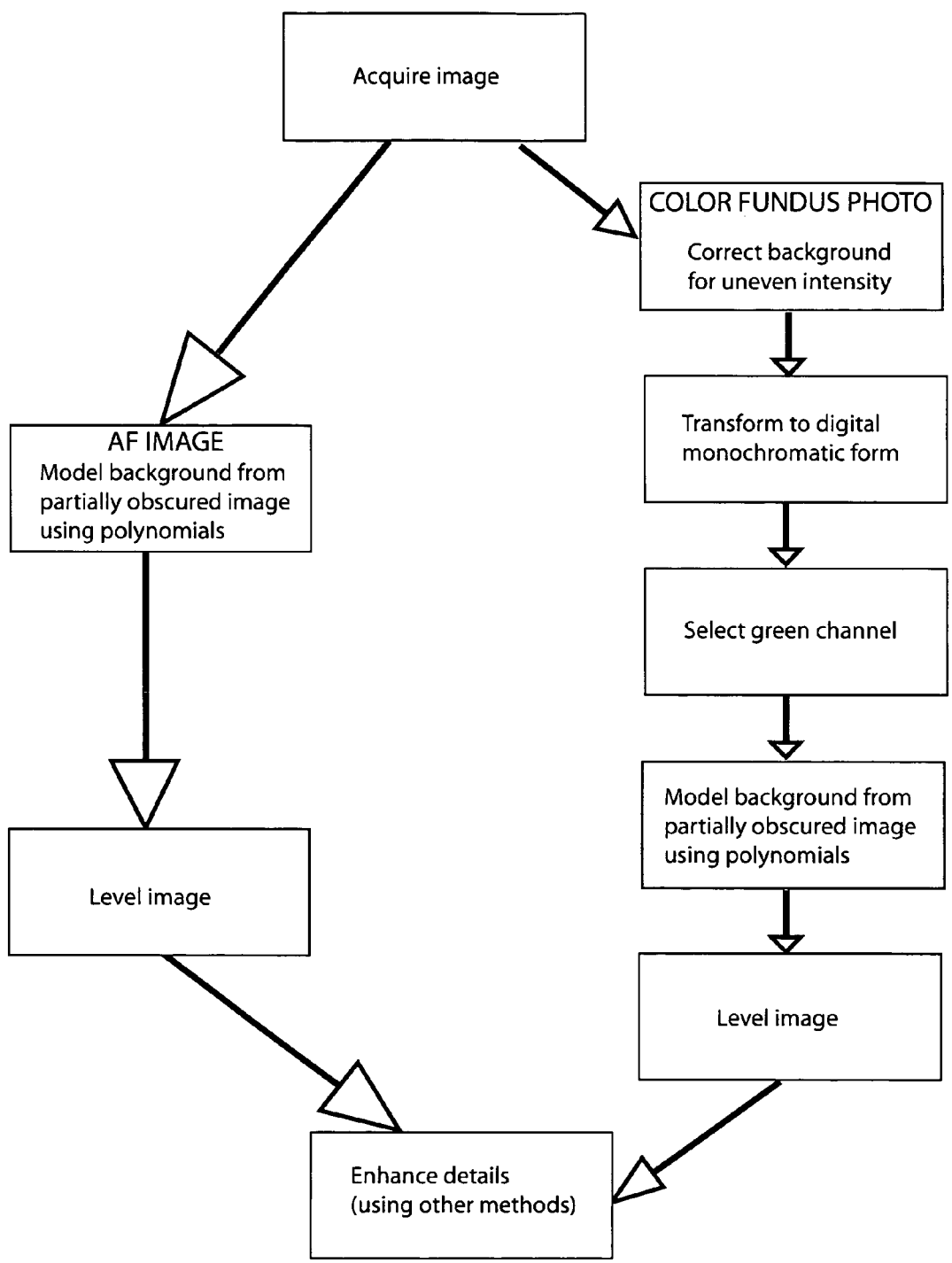
FIG. 7. is a flow chart illustrating our method of image enhancement and reconstruction for retinal images where the background is partially obscured by pathology.

FIG. 7 summarizes the process described in the two examples above in a flow chart form.

Segmentation of Pathology

The ability of this method to reconstruct foveal images from a small subset of points and enhance these images by leveling the background suggests significant utility in analyzing macular pathology.

Once images that contain pathology have been enhanced by leveling the background, automated methods involving thresholding can be carried much more effectively than has been possible heretofore to quantify the pathology. Other image analysis methods such as neural networks can also perform more effectively once the image has been enhanced by our method.

While the foregoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A method for enhancing images having non-uniform backgrounds, comprising:
providing a first digital image of an object of interest, said image having a background of non-uniform intensity;
processing the first image to obtain a second digital image, said second digital image containing information regarding the non-uniformity in the background of the first image;
subtracting the second image from the first image to obtain a third digital image with a background of more uniform intensity; and
displaying the third digital image to a user,
wherein said processing and subtracting are effected via a digital computer or other digital data processor.

2. The method of claim 1, wherein said first digital image is one of an image acquired by a camera or other digital device and a traditional film-based photograph which has been scanned and digitized.

3. The method of claim 1, wherein said processing of the first digital image includes using a mathematical algorithm that best fits the pixel data of the first digital image to construct the second image.

4. The method of claim 3, wherein the processing of the first digital image uses all pixels from the first digital image as inputs.

5. The method of claim 3, wherein the processing of the first digital image uses only a portion of the pixels from the first digital image as inputs.

6. The method of claim 1, wherein said mathematical algorithm is a quadratic polynomial, and wherein one of all and a portion of the pixel data from the first digital image is used to determine the quadratic polynomial that is the best fit to the first digital image.

7. The method of claim 6, wherein said best fit is determined by using a least square fitting method.

8. The method of claim 1, wherein said method is iterated a number of times chosen by a user.

9. A method for enhancing images having non-uniform backgrounds, comprising:
providing a first digital image of an object of interest, said image having a background of non-uniform intensity;
dividing said first digital image into at least two regions;
processing each region to obtain a set of second digital images, each of said second digital images containing information regarding the non-uniformity in the background of an associated region of the first image;
combining the second digital images to form a combined second image;
subtracting the combined second image from the first image to obtain a third digital image; and
displaying the third digital image to a user,
wherein said dividing, processing and subtracting are effected via a digital computer or other digital data processor.

10. The method of claim 9, wherein said first digital image is one of an image acquired by a camera or other digital device and a traditional film-based photograph which has been scanned and digitized.

11. The method of claim 9, wherein said processing of each region includes using a mathematical algorithm that best fits the pixel data of the first digital image to construct the second image.

12. The method of claim 9, wherein said processing of each region uses all pixels from the region as inputs.

13. The method of claim 9, wherein said processing of each region uses only a portion of the pixels from the region as inputs.

14. The method of claim 11, wherein said mathematical algorithm is a quadratic polynomial, and wherein one of all and a portion of the pixel data from the first digital image is used to determine the quadratic polynomial that is the best fit to the first digital image.

15. The method of claim 14, wherein said best fit is determined by using a least square fitting method.

16. The method of claim 9, wherein said method is iterated a number of times chosen by a user.

17. The method of claim 9, wherein said processing of a region is iterated a number of times chosen by a user.

18. The method of claim 9, wherein said regions are selected based on the intensity distribution of the first image, either manually or automatically using statistical parameters, so as to keep pixels of relatively similar intensity in the same region.

19. The method of claim 9, wherein the first digital image is divided into separate regions for background data and objects of interest data.

20. The method of claim 9, wherein the first digital image is divided into separate regions for background data, objects of interest data and other structures data.

21. The method of claim 9, further comprising smoothing the combined second image along the boundaries between regions prior to said subtraction.

22. The method of claim 9, wherein the first digital image is divided into separate regions based on an Otsu segmentation.

23. The method of claim 9, wherein said processing of each region comprises processing one of said regions using a mathematical algorithm that best fits the pixel data of that region to, and leaving the other regions unchanged.

24. The method of claim 23, wherein the first digital image is divided into separate regions based on an Otsu segmentation.

25. A method for enhancing images having non-uniform backgrounds, comprising:
providing a first digital image of an object of interest, said image having a background of non-uniform intensity;
dividing said first digital image into at least two regions;
segmenting the pixels of each region into at least two groups using a defined first algorithm;
processing each region by applying a defined second algorithm to at least one of said segmented pixel groups to obtain a set of second digital images, each of said second digital images containing information regarding the non-uniformity in the background of an associated region of the first image;
combining the second digital images to form a combined second image;

subtracting the combined second image from the first image to obtain a third digital image; and displaying the third digital image to a user, wherein said dividing, processing and subtracting are effected via a digital computer or other digital data processor.

26. The method of claim 25, further comprising:

segmenting said third digital image into at least two pixel groups using the defined first algorithm;

processing said third digital image by applying the defined second algorithm to at least one of said segmented pixel groups to obtain a fourth digital image, said fourth digital image containing information regarding the non-uniformity in the background of the third digital image;

subtracting the fourth digital image from the third digital image to obtain a fifth digital image; and displaying the fifth digital image to a user.

27. The method of claim 26, further comprising smoothing the second and fourth digital images along the boundaries between regions prior to respectively subtracting them from the first and third digital images.

28. The method of claim 25, wherein the defined first algorithm is the Otsu method and the defined second algorithm is a quadratic polynomial composed of six coefficients.

29. The method of claim 25, wherein said first digital image is one of an image acquired by a camera or other digital device and a traditional film-based photograph which has been scanned and digitized.

30. The method of claim 25, wherein said processing of each region includes using a mathematical algorithm that best fits the pixel data of the first digital image to construct the second image.

31. A computer program product comprising a computer usable medium having computer readable program code means embodied therein, the computer readable program code means in said computer program product comprising means for causing a computer to:

receive a data array representing an image of an object of interest;

divide the data array into regions;

divide the data in each region into subsets using statistical parameters;

fit a quadratic polynomial function $Q(x, y)$ to the subsets in each region to create a segment image, each segment image reflecting the non-uniformity in the background of the region;

smooth out the segment image along the boundaries between regions;

combine the segment images to form a new data array;

subtract the new data array from the original data array; and display the result of said subtraction to a user as an image.

32. A computer program product comprising a computer usable medium having computer readable program code means embodied therein, the computer readable program code means in said computer program product comprising means for causing a computer to perform any of the methods of claims 1, 9, 25, 26.

* * * * *

UNITED STATES PATENT AND TRADEMARK OFFICE
CERTIFICATE OF CORRECTION

PATENT NO.         : 7,248,736 B2
APPLICATION NO.    : 10/827862
DATED              : July 24, 2007
INVENTOR(S)        : R. Theodore Smith et al.

It is certified that error appears in the above-identified patent and that said Letters Patent is hereby corrected as shown below:

Column 1, line 4, please insert the following header and paragraph:

--Statement Regarding Federally Sponsored Research or Development
This invention was made with government support under grant number EY000431 awarded by the National Institute of Health. The government has certain rights in the invention.--

Signed and Sealed this
Thirteenth Day of November, 2012

David J. Kappos
*Director of the United States Patent and Trademark Office*